(12) United States Patent
Valente et al.

(10) Patent No.: US 6,658,171 B2
(45) Date of Patent: Dec. 2, 2003

(54) OPTICAL FIBER BRAGG GRATING POLARIZER

(75) Inventors: Luiz Carlos Guedes Valente, Rio de Janeiro (BR); Pedro Ignacio Torres Trujillos, Medellín (CO)

(73) Assignee: Ericsson Telecomunicacoes S.A., San Paulo (BR)

( * ) Notice: Subject to any disclaimer, the term of this patent is extended or adjusted under 35 U.S.C. 154(b) by 0 days.

(21) Appl. No.: 10/055,204

(22) Filed: Jan. 21, 2002

(65) Prior Publication Data

US 2002/0196992 A1 Dec. 26, 2002

Related U.S. Application Data

(60) Provisional application No. 60/298,618, filed on Jun. 14, 2001.

(51) Int. Cl.[7] ............................................. G02F 1/295
(52) U.S. Cl. .............................. 385/10; 385/37; 385/11; 372/102; 372/6
(58) Field of Search ............................ 385/37, 10, 11, 385/16, 24, 28, 12, 17; 372/102, 6, 32

(56) References Cited

U.S. PATENT DOCUMENTS

| | | | |
|---|---|---|---|
| 4,659,923 A | 4/1987 | Hicks, Jr. | 250/227 |
| 5,469,520 A | 11/1995 | Morey et al. | 385/37 |
| 5,546,481 A | 8/1996 | Meltz et al. | 385/11 |
| 5,781,677 A | * | 7/1998 | Jin et al. | 385/37 |
| 5,841,131 A | 11/1998 | Schroeder et al. | 250/227.17 |
| 6,221,565 B1 | 4/2001 | Jain et al. | 430/321 |
| 6,229,827 B1 | 5/2001 | Fernald et al. | 372/20 |

OTHER PUBLICATIONS

Kawase L.R. et al., "Force Measurement Using Induced Birefringence on Bragg Gratings", 1997.

* cited by examiner

*Primary Examiner*—Phan T. H. Palmer

(57) ABSTRACT

Method and apparatus for polarizing light propagating in an optical fiber. The apparatus has an optical fiber having a Fiber Bragg Grating (FBG) section of predetermined length therein, and a force applying device for applying a lateral force to a predetermined portion of the FBG section. The predetermined portion comprises a predetermined percentage of the predetermined length. When the predetermined percentage is equal to or greater than about 10 percent, two polarization states for the light passing through the optical fiber are obtained. When the predetermined percentage is a small portion of the grating length, for example, about 1 percent of the length of a chirped grating, a finely tunable optical fiber polarizer is provided. The apparatus can use standard optical fiber such as telecomm fiber and provides various advantages including the capability of being switched on and off by simply applying and withdrawing the lateral force.

16 Claims, 3 Drawing Sheets

OPTICAL FIBER BRAGG GRATING POLARIZER

CROSS REFERENCE TO RELATED APPLICATIONS

This application claims the benefit under 35 U.S.C. 119(e) of U.S. Provisional application Ser. No. 60/298,618 filed on Jun. 14, 2001.

BACKGROUND OF THE INVENTION

1. Field of the Invention

The present invention relates generally to the field of light polarization. More particularly, and not by way of limitation, the present invention relates to the polarization of light propagating in an optical fiber.

2. Description of the Prior Art

In many applications, it is important to obtain a pure state of light polarization while, at the same time, keeping the light guided inside the core of an optical fiber. In one important application, for example, there is a need to adjust the polarization of light prior to sending the light to an external electo-optical modulator.

One known approach to providing linearly polarized light in an optical fiber is to utilize a special optical fiber; for example, a special polarizing fiber manufactured by 3M®. In such a fiber, one state of polarization experiences a very high loss while the other state suffers relatively low losses. According to the manufacturer, a straight 3 meter length of this special fiber is capable of obtaining a 20 dB extinction ratio, while coiling the same length in a 3 cm diameter rod provides an extinction ratio of over 40 dB.

Other approaches for providing an in-line polarizer employ technology utilized to fabricate polished fiber couplers or D-shaped fibers. In these alternative approaches, the flat part of the fiber is coated with different layers which include a buffer layer and a metallic absorbing layer.

Each of the above-described approaches is not fully satisfactory. For example, the approach utilizing the special 3M® polarizing fiber implies the use of several meters of a fiber that is rather expensive. Furthermore, in the telecommunications field, a problem that is common to approaches based on the use of special fibers is the coupling efficiency of light from a standard telecomm fiber to the polarizing fiber. The approaches that utilize technologies to fabricate polished fiber couplers or D-shaped fibers suffer from the problem that very well-controlled film deposition and cladding thickness are required.

An optical fiber that incorporates a grating to polarize light propagating therethrough is also known in the art. U.S. Pat. No. 5,546,481 to Meltz et al., for example, discloses a single polarization fiber/amplifier that includes a nonpolarization preserving fiber having a grating tap incorporated therein. The grating tap in the Meltz et al. patent is described as being oriented at a predetermined angle, as having a predetermined grating spacing and grating strength, and as having a grating length that extends substantially the entire length of the optical fiber so as to couple-out of the optical fiber a predetermined amount of one polarization over a predetermined wavelength range while passing the second polarization as an output light from the optical fiber.

Although Meltz et al. provides linearly polarized light guided in a normal optical fiber, rather than a special fiber as described above, polarization in Meltz et al. is attained by Brewster angle reflection. As a result, in Meltz et al., there is a disadvantage in that light in the rejected polarization state is coupled out of the fiber and cannot be used.

SUMMARY OF THE INVENTION

The present invention provides a method and apparatus for polarizing light propagating in an optical fiber that does not require the use of a special fiber and that provides several advantageous properties generally not found in known optical fiber polarizers.

An apparatus for polarizing light propagating in an optical fiber according to the present invention comprises an optical fiber having a Fiber Bragg Grating (FBG) section of predetermined length, and a force applying mechanism for applying a lateral force to a predetermined portion of the Fiber Bragg Grating section.

It has been discovered that by providing an optical fiber with a Fiber Bragg Grating section, separation of the two polarization states of light propagating in the optical fiber can be obtained by applying a lateral force to a predetermined portion of the Fiber Bragg Grating section. As a result, polarized light can be obtained using a standard telecomm fiber or other optical fiber in which a strong refractive index modulation can be obtained, without requiring the use of more costly special fibers.

According to an embodiment of the present invention, the light polarization can be tuned by varying the position where the force is applied by the force applying mechanism, or by controlling the amount of the force applied. In particular, if the pressed portion of the FBG is a small portion of the total grating length, e.g., about one percent of the grating length, it is possible to have an intraband spectral hole in the reflectance spectrum for one polarization, with no destructive interference for the other polarization. In this case, the small length is not long enough to present significant reflectivity by itself such that the applied force introduces a phase difference between two long parts of the grating separated by the small pressed region. On the other hand, if the pressed portion of the FGB is equal to or greater than about 10 percent of the grating length, a main loss peak and a secondary loss peak can be observed that correspond to the fast and slow axes of the pressed region. In this case, the pressed region has to be sufficient to present a strong reflectivity by itself; i.e., the pressed region will act as an asymmetric grating. In one embodiment, for example, a uniform grating can be provided and its total length pressed. Thus, by pressing the FBG in a controlled manner on a predetermined portion of the grating length, polarization of light propagating in the optical fiber can be readily achieved.

In the present invention, polarized light is attained by applying force to a portion of an FBG section of an optical fiber to introduce a difference in Bragg wavelength of each polarization state. As a result, light in the rejected polarization state is guided backwards in the fiber rather than being coupled out of the fiber. Accordingly, with the present invention, it becomes possible to utilize the light in the rejected polarization state, if desired. Furthermore, the apparatus for polarizing light according to the present invention operates at two spectral bands with reversed effects for each polarization state. In other words, with the present invention, in a first operating band, polarization state Y will be transmitted and polarization state X will be reflected; while in a second operating band, the effect will be the opposite, where the xy plane is perpendicular to the propagation axis z of the fiber, and x is defined as the direction along the applied force.

According to a further embodiment of the invention, inasmuch as the polarization is dependent on the force applied to the FBG portion, the polarizing apparatus can be easily switched on or off simply by applying or releasing the force.

According to other embodiments of the invention, the FBG can be homogeneous or chirped. When the FBG is homogeneous, the operating range is a few nanometers and the center wavelength has some limited tunability. When the FBG is chirped, the polarizing effect takes place within a narrow wavelength window but it can be continuously tuned along the chirped grating reflection spectrum.

According to yet another embodiment of the present invention, the optical fiber can comprise highly birefringent fiber. Although the coupling efficiency is reduced somewhat when using such a fiber, the permanent birefringence allows the apparatus to be used with zero applied force or with less force compared to that required with standard telecomm fiber.

With a light polarizing apparatus according to the present invention, it is possible to use a standard optical fiber rather than a special optical fiber. The optical fiber can be a standard telecomm fiber or another optical fiber in which a strong refractive index modulation can be created. The apparatus is also suitable for mass production procedures.

Yet additional objects, features and advantages of the present invention will become apparent hereinafter in conjunction with the following detailed description of presently preferred embodiments thereof.

DETAILED DESCRIPTION OF PRESENTLY PREFERRED EMBODIMENTS

Figure 1:
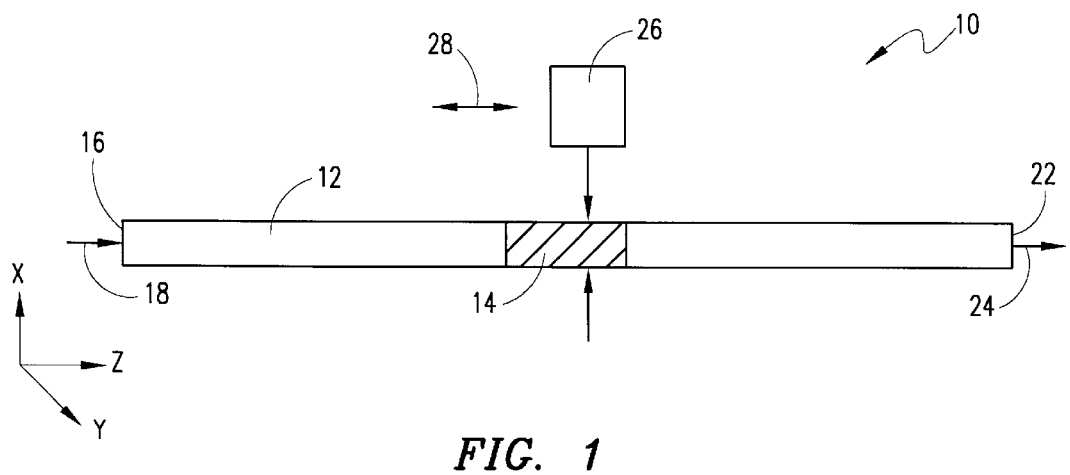
FIG. 1 schematically illustrates an apparatus for polarizing light propagating in an optical fiber according to a presently preferred embodiment of the present invention.

FIG. 1 schematically illustrates an apparatus for polarizing light propagating in an optical fiber according to a presently preferred embodiment of the present invention. The apparatus is generally designated by reference number 10, and includes an optical fiber 12 having an FBG section 14 therein. The optical fiber 12 includes an input end 16 at which light is input into the optical fiber as indicated by arrow 18, and an output end 22 from which light propagating through the optical fiber outputs from the optical fiber as indicated by arrow 24.

Optical fiber 12 can be of any length and diameter suitable for a particular application, and preferably comprises a standard optical fiber such as standard telecomm fiber or another fiber having good coupling to a standard telecomm fiber and in which a strong refractive index modulation can be created. FBG section 14 of optical fiber 12 comprises a section of predetermined length as will be described more fully hereinafter.

As also illustrated in FIG. 1, apparatus 10 further includes a force applying mechanism 26 for controllably applying a lateral force to a predetermined portion of FBG section 14. Force applying mechanism 26 can comprise any one of a variety of mechanisms, and preferably comprises a Piezoelectric or magneto-strictive element or another element by which it is relatively easy to control the amount of force applied by the device. The force applying mechanism functions to introduce a difference in Bragg wavelength of each polarization state of the light propagating in the optical fiber. The force is applied from top to bottom of the optical fiber or in some other manner to provide the asymmetry necessary to create the polarizing effect. In addition, and as will be explained more fully hereinafter, a moving device, such as a small motor or the like, is provided in order to change the position at which the force is applied by the force applying mechanism. This moving device is schematically represented in FIG. 1 by arrow 28 and can be designed to move the optical fiber and/or the force applying mechanism.

In particular, when an optical fiber is laterally pressed, the optical path through the optical fiber is altered due to changes in both the refractive index and the fiber length. If the pressed region contains an FBG, these effects bring about a quantitative local shift in the Bragg wavelength. The Bragg wavelength shift quantity can be polarization dependent if the applied strain ($\epsilon$) is not isotropic.

The relationship between strain and induced change in the reflected wavelength in an FBG (with the fiber axis parallel to the z-direction) can be expressed by:

$$\Delta\lambda_{Bx} = \lambda_B \varepsilon_z - n_{\text{eff}}^2 \frac{\lambda_B}{2}[P_{11}\varepsilon_x + P_{12}(\varepsilon_z + \varepsilon_y)], \tag{1a}$$

$$\Delta\lambda_{By} = \lambda_B \varepsilon_z - n_{\text{eff}}^2 \frac{\lambda_B}{2}[P_{11}\varepsilon_y + P_{12}(\varepsilon_z + \varepsilon_x)] \tag{1b}$$

where the indices x, y and z represent the three Cartesian axes (see FIG. 1), $n_{\text{eff}}$ is the effective refractive index in the fiber, and $P_{11}$ and $P_{12}$ are matrix elements of the electro-optic tensor (for silica, for example, $P_{11}=0.113$ and $P_{12}=0.252$). The strain $\epsilon_i$ and the affected length can be linked with the applied force by using a model proposed in the paper "Fiber Bragg Grating (FGB) Characterization and Shaping by Local Pressure", C J S de Matos, P Torres, L C G Valente, W Margulis and R Stubbe, *Journal of Lightwave Technology*, vol. 19, no. 8, pages 1206–1211, August, 2001 (referred to hereinafter as the "JLT" paper).

Plane Strain: $\epsilon_z$–0

The equations are reduced to:

$$\Delta\lambda_{Bx} = -n_{\text{eff}}^2 \frac{\lambda_B}{2}[P_{11}\varepsilon_x + P_{12}\varepsilon_y], \tag{2a}$$

$$\Delta\lambda_{By} = -n_{\text{eff}}^2 \frac{\lambda_B}{2}[P_{11}\varepsilon_y + P_{12}\varepsilon_x], \tag{2b}$$

If $\epsilon_x=-2\epsilon_y$, as it was proposed in the JLT paper, we obtain the following relation:

$$\frac{\Delta\lambda_{Bx}}{\Delta\lambda_{By}} = \frac{2P_{11}-P_{12}}{2P_{12}-P_{11}} = -0.0665 \qquad (3)$$

This equation confirms simulated results described in the paper "Analysis of Induced-Birefringence Effects on Fiber Bragg Gratings", R. Gafsi and M A El-Sherif, *Optical Fiber Technology*, no. 6, pages 299–323 (2000).

To model a locally pressed FBG, the value of $\Delta\lambda_B$ for one polarization was adjusted until the desired transmission condition was attained. Hence, by using equation (3)$\Delta\lambda_B$ for the other polarization can also be simulated.

Assume a 4 cm-long unapodized strong grating with an index change of $2.5\times10^{-4}$ and a chirp of −45 pm/mm. The effective index of the fiber core was taken to be $n_{eff}=1.46$ and a design wavelength of 1530 nm. Under these conditions, the grating has a bandwidth of ~1.49 nm. It was considered that the fiber axis was parallel to the z direction and that the force is applied along the x-axis. In this way, from equations (1a) and (1b), $\Delta\lambda_{By}>\Delta\lambda_{Bx}$. The grating structure that was used can easily be fabricated using either a phase mask or holographic approaches.

In order to investigate how each polarization is transmitted (or reflected), a polarization factor as $$F=T_x-T_y, \qquad (4)$$

is defined, where $T_x$ and $T_y$ are the transmission of the grating for the light polarization on x and y axes, respectively. If F=0, the grating is totally polarization independent. When F is positive, the transmission is greater for x-polarized light than it is for y-polarized light. When F is negative, the grating is suitable, in transmission mode, for y-polarized light.

Figure 2A:
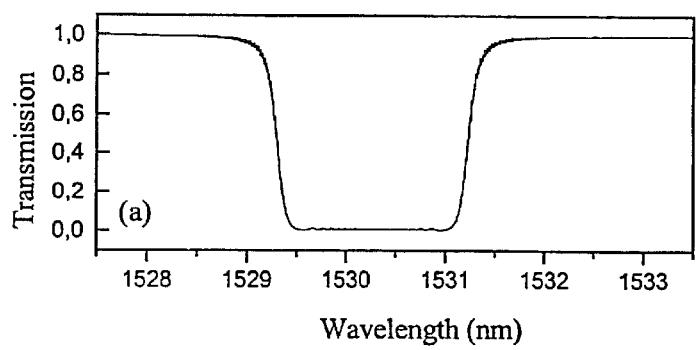
FIGS. 2A–2C are graphs illustrating the transmission spectra of an unapodized chirped FBG with a pressed region l=0.2 mm for both polarizations with no applied force, for x-polarization with an applied force, and for y-polarization with an applied force, respectively, according to an embodiment of the present invention.
Figure 2B:
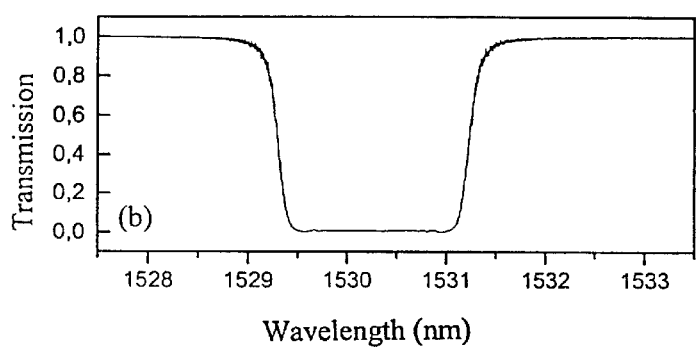
Figure 2C:
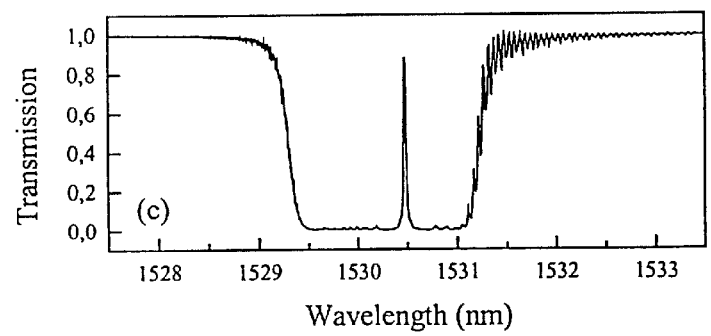
Figure 3:
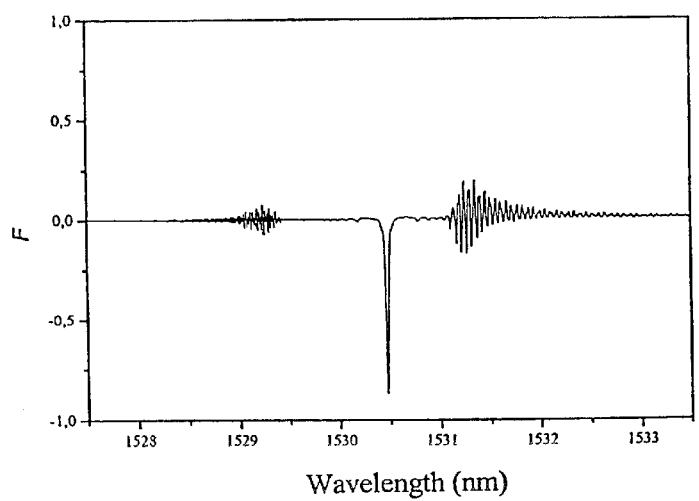
FIG. 3 is a graph illustrating the polarization factor F ($F=T_x-T_y$) for the conditions in FIG. 2.

A chirped FBG with a perturbed small section was modeled considering $L_2=0.2$ mm. Transmission spectra are shown in FIGS. 2A–2C. The curve in FIG. 2A represents both polarization states with no applied force, the curve in FIG. 2B represents x-polarization with an applied force, and the curve in FIG. 2C represents y-polarization with an applied force. In this case was considered a wavelength increase $\Delta\lambda_{By}=2$ nm; the other polarization was calculated by using equations 1(a) and 1(b). It is seen that for the y-polarized light, a strong increase in the transmission can be obtained by increasing the Bragg wavelength of the pressed section in $\Delta\lambda_{By}=2$ nm. It is estimated that this wavelength increase is attained with a lateral force of 320 gf. The x-polarized light suffers a small change in Bragg wavelength which is not enough to bring the necessary phase to induce a significant destructive interference. Y-polarized light is transmitted in a narrow band with linewidth of ~22 pm. From the corresponding polarization factor F for this case (equation 4), i.e., from the plot in FIG. 3, the y-polarized light is, in practice, the only light transmitted at a fixed wavelength. With this characteristic, this locally pressed FBG can be used as a highly selective polarizer. By scanning a force applying device along the grating with the same strength of strain, it is possible to tune the operation across the full grating spectrum, ~1.9 nm in this example.

Figure 4A:
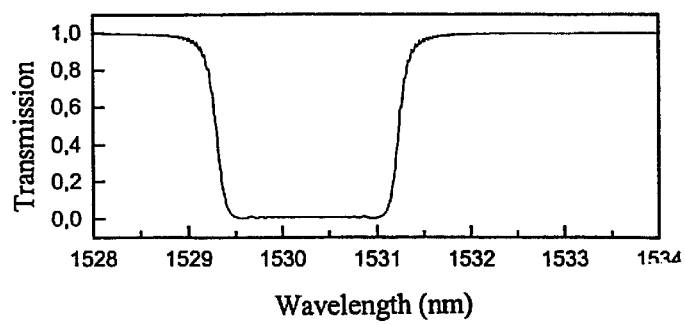
FIGS. 4A–4C are graphs illustrating the transmission spectra of an unapodized chirped FBG with a pressed region of l=10 mm for both polarization states with no applied force, for x-polarization with an applied force, and for y-polarization with an applied force, respectively, according to another embodiment of the present invention.
Figure 4B:
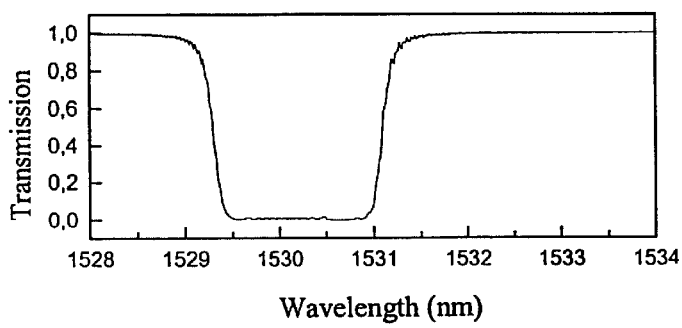
Figure 4C:
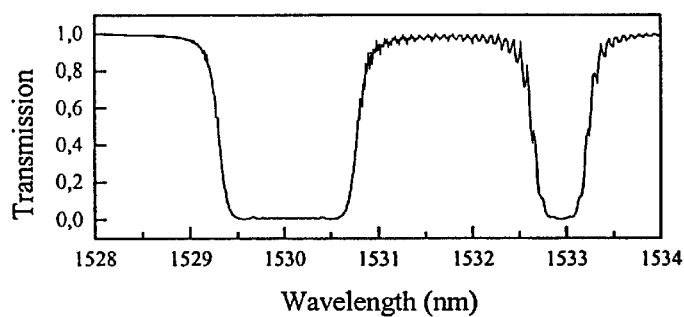
Figure 5:
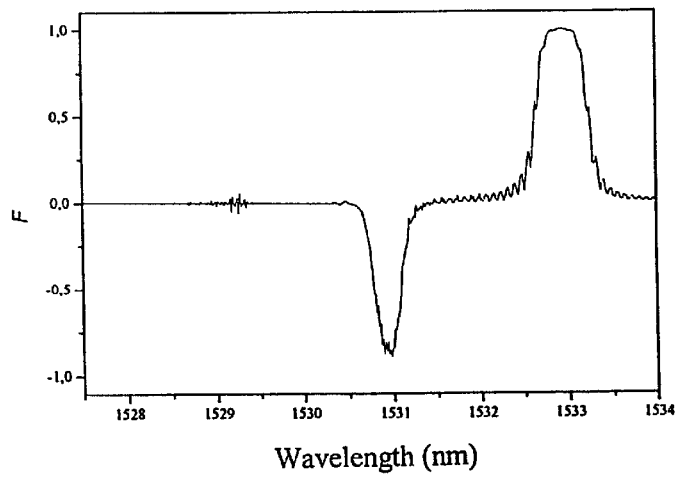
FIG. 5 is a graph illustrating the polarization factor F ($F=T_x-T_y$) for the conditions in FIG. 4.

The results for the second condition, when the perturbed section $L_2=10$ mm, are illustrated in FIGS. 4A–4C and FIG. 5. The curve in FIG. 4A represents both polarization states with no applied force, the curve in FIG. 4B represents x-polarization with an applied force, and the curve in FIG. 4C represents y-polarization with an applied force. It is seen that the main loss peak and a secondary loss peak in the spectral response, correspond to the fast and slow axes of the pressed region, with a polarization splitting of ~2 nm and a linewidth of ~620 pm. In this case, the length considered was $L_2=10$ mm and the wavelength increase in $\Delta\lambda_{By}=2$ nm. By applying equations (1a) and (1b), the other polarization was calculated. The corresponding polarization factor F (FIG. 5) indicates a transmission (reflectivity) near 100% for each light polarization. With these characteristics, the grating performs well as a polarizer at the wavelength where F is close to +/−1 in FIG. 5. It is clear that the operation mode in this configuration is completely different from the operation mode in the first case. In this configuration, a large intensity of the reflection by the pressed region of the grating is required in order to have strong side lobes where the polarization effects will take place. As the position of the secondary loss peak is a function of the applied force, the spectral tuning will be accomplished by varying the applied force. Nevertheless, chirped gratings with bandwidth in excess of 10 nm can be routinely fabricated.

Finally, by controlling the applied force, the modeled polarizer can easily be switched on or off for the desired wavelength by simply applying or releasing the force applied by the force applying mechanism. The ultimate bandwidth achievable is limited by the polarization splitting, which is directly related to the applied force.

Figure 6:
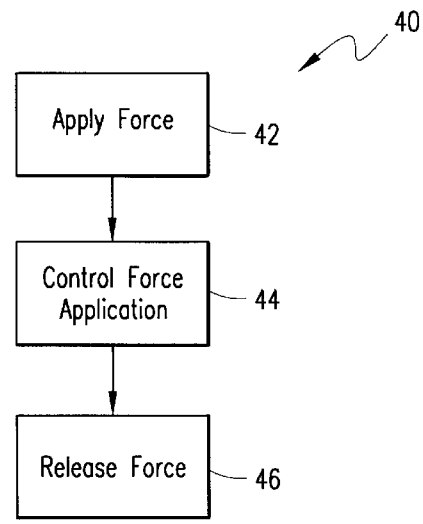
FIG. 6 is a flowchart illustrating a method for polarizing light propagating in an optical fiber according to another embodiment of the present invention.

FIG. 6 is a flow chart that schematically illustrates a method 40 for polarizing light propagating in an optical fiber that includes a Fiber Bragg Grating of predetermined length according to an embodiment of the present invention. Initially, as shown in step 42, a force is applied to a predetermined percentage of the predetermined length of the FBG to switch on the polarizer. The applied force is controlled to polarize the light propagating in the optical fiber (step 44). Finally, the polarizer can be switched off by releasing the applied force as shown at step 46.

An apparatus for polarizing light propagating in an optical fiber according to the present invention can be easily constructed using a standard optical fiber, such as standard telecomm fiber; and, as indicated above, provides significant advantages over polarizers that depend on using special fibers including being more economical and providing greater coupling efficiency when connected to standard optical fibers. In addition, because, in the present invention, the light in the rejected polarization state is guided backwards in the optical fiber; this light is capable of being used, if desired. For example, if the apparatus is used to probe the polarization state of light; one will need information concerning the relative amount of light in each polarization, not only the amount of light in one polarization state which is obtained in prior apparatus wherein one polarization is lost. The apparatus according to the present invention is also suitable for mass production techniques.

The FBG according to the present invention can be homogeneous or chirped. For a homogeneous FBG, the operating range can be up to a few nanometers and the center wavelength has some limited tunability. For a chirped FBG, the polarizing effect takes place only at a relatively narrow wavelength; however, it can be continuously tuned along the chirped grating reflection spectrum. Thus, for a chirped FBG, the apparatus operates as a tunable polarization selective narrow band transmission filter. It is also possible to use a highly birefringent fiber instead of telecomm fiber, if desired. In such case, the coupling efficiency is reduced, however, the permanent birefringence allows the apparatus to be used with zero applied force or with less force compared to an apparatus made using standard telecomm fiber.

It should be understood that the term "comprises/comprising" when used in this specification is taken to specify the presence of stated features, integers, steps or components; but does not preclude the presence or addition of one or more other features, integers, steps, components or groups thereof.

While what has been described herein constitutes presently preferred embodiments of the invention, it should be understood that the invention can be varied in numerous ways without departing from the scope thereof. Accordingly, it should be recognized that the invention should be limited only insofar as is required by the scope of the following claims.

What is claimed is:

1. An apparatus for polarizing light propagating in an optical fiber, comprising:
    an optical fiber having a Fiber Bragg Grating section of predetermined length; and
    a force applying mechanism for applying a lateral force to a predetermined portion of the Fiber Bragg Grating section, wherein said predetermined portion comprises a predetermined percentage of the predetermined length of the Fiber Bragg Grating section.

2. The apparatus according to claim 1, wherein said predetermined percentage is a small portion of the total grating length.

3. The apparatus according to claim 2, wherein said predetermined percentage comprises about 1 percent.

4. The apparatus according to claim 1, and further including a moving device for changing the position at which said force is applied by said force applying mechanism.

5. The apparatus according to claim 1, wherein said predetermined percentage is equal to or greater than about 10 percent, wherein a spectral tuning of the light is achieved.

6. The apparatus according to claim 1, wherein said Fiber Bragg Grating section is homogeneous and wherein said apparatus has a tunable operating range of a few nanometers.

7. The apparatus according to claim 1, wherein said Fiber Bragg Grating is chirped, and wherein said apparatus can be continuously tuned along a chirped grating reflection spectrum.

8. The apparatus according to claim 1, wherein said optical fiber comprises a telecomm optical fiber.

9. The apparatus according to claim 1, wherein said optical fiber comprises an optical fiber with high photosensitivity.

10. The apparatus according to claim 1, wherein said optical fiber comprises a highly birefringent optical fiber.

11. A method for polarizing light propagating in an optical fiber, comprising:
    providing an optical fiber having a Fiber Bragg Grating section of predetermined length; and
    applying a lateral force to a predetermined portion of said Fiber Bragg Grating section for polarizing light propagating in said optical fiber, wherein said step of applying a lateral force to a predetermined portion of said Fiber Bragg Grating section comprises applying a lateral force to a predetermined percentage of the predetermined length of said Fiber Bragg Grating section.

12. The method according to claim 11, wherein said predetermined percentage comprises a small portion of the total grating length.

13. The method according to claim 12, wherein said predetermined percentage comprises about 1 percent.

14. The method according to claim 11, and further including the step of withdrawing the applied lateral force for switching off said light polarization.

15. The method according to claim 11, wherein said predetermined percentage comprises about 10 percent or more.

16. A method for controlling an apparatus for polarizing light propagating in an optical fiber, comprising:
    providing an optical fiber having a Fiber Bragg Grating section of predetermined length;
    switching on said apparatus by applying a lateral force to a predetermined portion of said predetermined length, wherein said predetermined portion comprises a predetermined percentage of the predetermined length of the Fiber Bragg Grating section;
    polarizing said light propagating in said optical fiber by controlling one or both of the position and the amount of the force applied to said predetermined portion; and
    switching off said apparatus by withdrawing said lateral force.

* * * * *